United States Patent [19]

Dancy

[11] 4,102,708
[45] Jul. 25, 1978

[54] SELF-HEALING THERMOCOUPLE

[75] Inventor: Edna A. Dancy, Beaconsfield, Canada

[73] Assignee: Sidbec-Dosco Ltee, Montreal, Canada

[21] Appl. No.: 760,372

[22] Filed: Jan. 18, 1977

[51] Int. Cl.² ............................................. H01L 35/02
[52] U.S. Cl. .................................... 136/233; 136/230; 136/234
[58] Field of Search .................... 136/230, 233, 236 R, 136/239, 242, 234

[56] References Cited

U.S. PATENT DOCUMENTS 3,942,242  3/1976  Rizzolo ................................. 136/233

FOREIGN PATENT DOCUMENTS 854,570  3/1959  United Kingdom ................. 136/233

Primary Examiner—Leland A. Sebastian

[57] ABSTRACT

A device for continuously monitoring the internal surface temperature of a refractory lining in a metallurgical furnace. The device comprises an outer sheath, a pair of dissimilar, metallic wires within the outer sheath and a powdered oxide material closely packed within the sheath and surrounding both wires. Each wire is separately insulated by a sleeving of a refractory material having a melting point higher than the normal working temperature of the furnace at the surface of the lining. The oxide material used as a packing between the outer sheath and the wires is electrically conductive at elevated temperatures and has also a melting point higher than the temperature normally encountered at the surface of the lining. Both the refractory material and oxide material, when exposed to the aforesaid normal working temperature, react with each other to form a conducting bridge between the dissimilar wires at the surface of the lining, which bridge is operative to provide a signal related to the internal surface temperature of the lining. This reaction requires a temperature substantially equivalent to that normally encountered at the surface of the lining; thus, there is no chance that it will occur at an appreciable distance therefrom, so resulting in a conducting bridge distant from the temperature to be measured, which would give spurious temperature readings.

18 Claims, 3 Drawing Figures

SELF-HEALING THERMOCOUPLE

This invention is concerned with a device for the continuous measurement of temperature in a metallurgical furnace, with particular reference to the temperature at the surface of the refractory which lines the walls of an electric arc furnace. These walls can be exposed, from time to time, both to extremely rapid increases in temperature and to excessively high temperatures. The former causes cracking and spalling, while the latter causes melting which results in erosion. Both are deleterious to the furnace lining and result in the need for frequent re-lining.

It has been found that both problems can be avoided by controlling the power input to the electrodes, in other words, by reducing the power input when the rate of increase in temperature at the face of the refractory lining becomes excessive or when the temperature becomes too high. To do this, the temperature must be scanned continuously, even during the spalling and melting.

The junction of a conventional thermocouple is, of course, destroyed at the same time as the surface of the lining as soon as the attack on the walls begins. However, if such a thermocouple is adequately protected against the rigors to which the walls are exposed, the response time is so lengthened as to make the thermocouple useless for the purpose envisaged. If the protection is in the form of a graphite block, the response time is good, but the block must be water cooled for its own protection. Hence, such a device detects only change in temperature; it does not measure the true temperature.

Radiation pyrometry can be used, but the many problems arising from the conditions under which the measurements are made lead to uncertain temperature values. The problems include poor knowledge of the emisivity of the refractories, interference by the hot furnace atmosphere, and difficulty in locating a sighting hole.

The device most suited to the need is a self-healing thermocouple, namely a device in which a bridge immediately forms between the ends of the two thermocouple wires at the hot face of the wall lining as soon as the original junction or subsequently formed junction is destroyed either by spalling of the wall in which it is embedded, or by melting, or by any inadvertent mechanical means such as being struck by the charge, as, for example when the scrap piled around the sides of the furnace slips downwards. This implies that the bridge must be formed as soon as possible after the newly exposed cross-section of the thermocouple is exposed to the high temperature radiation from the arc.

British Patent Nos. 1,230,633 and 1,370,465 propose several embodiments of essentially similar thermocouples in which an insulating powder is packed between the two limbs of the thermocouple. This packing becomes conducting, forming a junction between the conductor ends, when conductive material resulting from the furnace environment is deposited on it, this deposit being a mixture of metals, metal oxides and slag. However, because this new junction originates from the furnace function, there could be considerable delay between the destruction of an existing junction and the formation of a new junction between the newly exposed ends of the conducting limbs. In other words, there could be considerable periods of time when the thermocouple is not producing a signal.

U.S. Pat. No. 3,845,706 to Strimple et al. describes a slightly different approach. In this case, the two conducting limbs of the thermocouple are insulated from each other by means of a sleeving of a glassy material on at least one of the wires and are packed in a powdered refractory material that is electrically conductive at high temperatures. In the description of these thermocouples, it is pointed out that although the refractory materials used, namely materials taken from the group chrome ore and chrome oxide, are initially non-conductive at temperatures below about 2000° F, after a single exposure to normal furnace operating conditions, a conducting bridge is formed between the conducting limbs, this bridge conducting at temperatures lower than 2000° F and even as low as ambient temperature, as evidenced by the fact that signals are received from the device. The reason for this is not fully understood. However, according to the patentee, it is believed that when the device is exposed to relatively high temperatures, the glass insulating sleeve surrounding at least one of the thermocouple wires, when heated in the presence of the chrome oxide or chrome ore, reacts with or is caused to form a conducting path that is independent of temperature.

It is appropriate here to examine more closely the electromotive force (e.m.f.) generated in the wires of a thermocouple. An electric current will flow in a closed circuit of two dissimilar, metallic materials if their junctions are at different temperature. If the circuit is opened at some point, the e.m.f. caused by the temperature difference can be measured. It should be emphasized that this e.m.f. is not a property of the junctions but depends on the bulk properties of the two materials and the temperatures of the two junctions. In thermocouples, one junction is held at a known temperature. The voltage is then a function of the temperature of the other junction. The effect does not depend on the nature of the junction. Hence it may be made in any convenient way such as by soldering, brazing, spot-welding, fusing or even by a length of another material forming a conducting bridge between the two dissimilar materials. The only restriction is that the ends of the two aforementioned dissimilar materials making up the junction must be at the same temperature.

In the event that the two ends are not at the same temperature at their points of contact with a bridge between them, inaccurate readings can be obtained. Examining this in detail, in a normal thermocouple:

$$V = (E_{12})_{T_1} - (E_{12})_{T_2} \tag{1}$$

where

V is the net voltage developed, $(E_{12})_{T_1}$ is the e.m.f. developed at the hot junction (at temperature $T_1$) between the dissimilar materials 1 and 2, and $(E_{12})_{T_2}$ is the e.m.f. developed at the cold junction (at temperature $T_2$) between the dissimilar materials 1 and 2.

If the change in e.m.f. in the couple is linear with increasing temperature, $$(E_{12})_{T_1} = S_{12}T_1 \tag{2}$$

and $$(E_{12})_{T_2} = S_{12}T_2 \tag{3}$$

where $S_{12}$ is the thermoelectric power or relative Seebeck coefficient of the couple composed of the two dissimilar materials 1 and 2 and is the voltage developed in the couple for a unit increase in temperature.

Thus:
$$V = S_{12}T_1 - S_{12}T_2 \quad (4)$$

It can be restated here that in thermocouple applications, one junction is usually held at a known temperature. The net voltage is then a function of the temperature of the other junction. Most tables of thermocouple data are given for the couple with one junction at a reference temperature.

Now, if there is a bridging material between the dissimilar materials 1 and 2 at the hot end and the temperature of the junction between the material 1 and the bridging material is not at the same temperature as the temperature of the junction between the material 2 and the bridging material, the net voltage V' developed will be given by:

$$V' = (E_{13})_{T_1} - (E_{23})_{T_3} - (E_{12})_{T_2} \quad (5)$$

where
$T_1$ is the temperature of the junction between material 1 and the bridging material 3,
$T_3$ is the temperature of the junction between material 2 and the bridging material 3,
$(E_{13})_{T_1}$ is the e.m.f. developed at temperature $T_1$ between the dissimilar materials 1 and 3, and
$(E_{23})_{T_3}$ is the e.m.f. developed at temperature $T_3$ between the dissimilar materials 2 and 3.

In the very likely event that, at least over the temperature range $T_1$ to $T_3$, the voltage change is linear with temperature, the above equation can be re-written $$V' = S_{13}T_1 - S_{23}T_3 - (E_{12})_{T_2} \quad (6)$$

where
$S_{13}$ is the relative Seebeck coefficient of the couple composed of the dissimilar materials 1 and 3, and
$S_{23}$ is the relative Seebeck coefficient of the couple composed of the dissimilar materials 2 and 3.

As discussed earlier, the e.m.f. produced is not a property of the junction but depends on the bulk properties of each of the two dissimilar materials. Thus:

$$S_{13} = S_1 - S_3 \quad (7)$$

and
$$S_{23} = S_2 - S_3 \quad (8)$$

where $S_1$, $S_2$ and $S_3$ are the absolute Seebeck coefficients of the materials 1, 2 and 3, respectively. The sign of $S_1$, $S_2$ and $S_3$ can be positive or negative, depending on the sign of the majority current carrier in the material. Thus the sign of the relative Seebeck coefficients can also be positive or negative.

Thus:
$$V' = S_1T_1 - S_3T_1 - S_2T_3 + S_3T_3 - (E_{12})T_2 \quad (9)$$

The junctions between each of the two ends of the thermocouple limbs and the bridging material should therefore be as nearly as possible at the same temperature if the measured voltage V' is to be used as a measure of the temperature. In that case, i.e., if $T_1 = T_3$, equation (9) and hence equation (6) is reduced to equation (1). This is especially important if $S_3$, the absolute Seebeck coefficient of the bridging material 3, is large compared with $S_1$ and $S_2$. In such an instance, the error could be as large as or even larger than the true reading.

In order to be capable of measuring the true and absolute temperature at the surface of the refractory lining in a metallurgical furnace, the thermocouple must be designed in such a way that the bridge can form only at the hot face of the lining so that $T_1 = T_3$ and that there is no possibility that contact can be made between either of the conducting limbs and a conducting bridge at a significant distance from the hot face, where $T_1 \neq T_3$. This requirement becomes especially important if the conducting bridge is composed of metallic oxides (including slag) because the absolute Seebeck coefficient of such materials is large compared with that of metallic conductors such as those used for the two limbs. Whereas the Seebeck coefficient of metals lies in the range of microvolts to tens of microvolts per degree Centigrade, that of oxides can amount to as much as millivolts per degree Centigrade.

In the thermocouples described in the aforesaid two British patents, the two conductors are separated over their whole length by an insulating powder such as $Al_2O_3$ or MgO. The bridging can occur only at the ends exposed to the furnace. Thus, the two junctions are inevitably at, or essentially at the same temperature. Hence, even though the bridging material is probably predominantly oxide in nature, these thermocouples should be satisfactory from the viewpoint of validity of any measurements that are obtained. These thermocouples are not completely satisfactory, however, because readings are only intermittently available.

In all the described embodiments of the Strimple and al. thermocouple, only one of the dissimilar wires is encased in a glass insulating sleeve. Bearing in mind that the two wires are then packed in oxide powder which is stated to become conducting at temperatures above 2000° F and that the temperature of the hot face is of the order of 2,700° to 2,900° F, there thus is the possibility of contact between the uninsulated wire and the insulated wire via a bridge of conducting oxide between one junction at 2000° F, a little way back from the hot face of the lining, and the other at at 2700° to 2900° F at the hot face. If this occurs, completely invalid temperature readings are obtained from the viewpoint of absolute measurement of temperature. Although U.S. Pat. No. 3,845,706 contemplates the insulation of both the dissimiilar wires, inaccuracy can still arise through the use of fiberglass sleeving as insulation. Unless this sleeving is of some special type of high temperature glass that does not melt until close to the temperature of the hot face of the lining, which is not specified in the patent, it is likely that a bridge will be formed according to the description of the patent, but significantly distant from the hot face. Thus the temperature measured could be close to the temperature at which the glass sleeving melts rather than that of the hot face, i.e., up to several hundred degrees too low. However, it should be emphasized that such a thermocouple can still be useful for detecting changes in temperature at the surface of the lining.

In summary then, each of the two types of self-healing thermocouples described above has an inherent drawback, the first because it might not function continuously and the second because it does not necessarily give readings that represent the true temperature of the hot face of the lining.

It is therefore an object of the present invention to overcome the aforementioned drawbacks and to provide a device for continuously measuring the absolute temperature at the surface of a refractory lining in a metallurgical furnace, throughout the life of the refractory lining.

It is a further object of the invention to provide such a device which relies upon the formation of a conducting bridge between two thermocouple wires at the surface of the refractory lining, to complete the electric circuit required to measure the temperature.

In accordance with the invention, there is thus provided a device for continuously monitoring the internal surface temperature of a refractory lining in a metallurgical furnace, which device comprises an outer sheath, a pair of dissimilar, metallic wires within the outer sheath and a powdered oxide material closely packed within the sheath and surrounding both wires. Each wire is separately insulated by a sleeving of a refractory material having a melting point higher than the normal working temperature of the furnace at the surface of the lining. The oxide material used as a packing between the outer sheath and the wires is electrically conductive at elevated temperatures and has also a melting point higher than the temperature normally encountered at the surface of the lining. Both the refractory material and oxide material, when exposed to the aforesaid normal working temperature, react with each other to form a conducting bridge between the dissimilar wires at the surface of the lining, which bridge is operative to provide a signal related to the internal surface temperature of the lining.

The invention requires insulation of both limbs of the thermocouple, which can be made of any of the well known platinum /$x$ percent rhodium versus platinum /$y$ percent rhodium pairs where, for example $x = 0$ or 6 and $y = 10$, 13 or 30. The insulation is high melting and preferably is of silica (quartz), mullite (alumina-silica system), high purity alumina, alumina of a lower grade (usually containing silica), or magnesium oxide. If it is in the form of solid tubing, it should advantageously have thin walls and have the smallest possible bore consistent with the wire gauge used such that the insulation is tightly fit over each wire and the formation of a conducting bridge with the oxide packing is ensured between both wires at elevated temperatures. If it is in the form of a woven sleeving, the minimum size for the wire diameter should preferably be chosen.

The invention also requires that a powdered oxide material which is conducting at high temperatures, that is, at about 1,100° C, be packed around the two insulated limbs of the thermocouple inside the outer sheath and that this material have a melting point somewhat higher, for instance 50° to 300° C, than the normal operating temperature at the surface of the lining. A preferred oxide material is of the group nickel ferrite, $NiO.x Fe_2O_3$, where $x$ lies between 1 and 1.2. This material has also the advantage that its conducting nature does not deteriorate due to contamination by the oxides of iron, calcium, manganese, aluminum, silicon and any other metals that might occur in the slag or brick in the furnace; in addition, its conductivity is not adversely affected by changes in the atmosphere of the furnace which might be either oxidizing or reducing. The material can be prepared in a number of different fashions, but it can advantageously be sintered in air at about 900° C for at least 12 hours to increase its density and to reduce shrinkage through sintering during use in the thermocouple. After sintering, the particle size can advantageously be reduced by any normal method so that most of the particles (about 90%) fall in the range − 50 to + 230 mesh (Tyler sieve). This gives fairly good pouring and packing characteristics. The balance of the particles can be both bigger and smaller. One way of preparing the ferrite powder is by intimately mixing stoichiometric quantities of nickel oxide, NiO, and ferric oxide, $Fe_2O_3$, both being reagent grade chemicals in fine powder form, and firing the resulting mixture according to the above sintering method. In this case, the sintering achieves the necessary solid-solid chemical reaction as well as the desired densification.

Because of the high melting temperature of the oxide material, the particles packed around the insulated wires do not melt on exposure to the normal working temperature at the surface of the lining. It has been found, however, that the particles sinter to each other. In addition, they react with the insulation around the dissimilar wires, sintering to the insulating material and undergoing some localized melting. This melting occurs because, almost without exception, when two different oxide materials are held in contact with each other at an elevated temperature, some product of the reaction has a lower melting point than either of the original materials. In the present case, the result is a viscid material, akin to a slag, that may be considered as just liquid or just solid and which adheres to the conducting wires to form a conducting bridge between them. Because of the characteristics of the materials employed for both the insulating sleeving and the conducting oxide, this reaction requires a temperature substantially equivalent to that normally encountered at the hot face. Thus, there is no danger that it will occur at an appreciable distance from the hot face, so resulting in a conducting bridge distant from the temperature to be measured, which would give spurious temperature readings.

As mentioned previously, the conducting wires can be any of the pairs of alloys of platinum and rhodium that are normally used for high temperature measurements. Their diameter is not important. However, diameters of 0.010 inch and greater generally make construction easier. They can be physically joined by twisting or by welding in the usual fashion if readings are required starting at at room temperature during the intitial heating up of the furnace, before the conducting bridge of oxides is formed. They can be positioned with respect to each other in a number of ways, each within its own insulating sleeving : side by side and as close as possible, with the powdered oxide material packed around them; side by side with the oxide powder packed between them as well as around them; if they are insulated by means of flexible, woven sleevings, they can be twisted together over the whole length that they are insulated, with the oxide powder packed around them. In addition, where they are positioned side by side in close proximity to one another, use can be made of a single double bore insulating tube instead of two single bore sleeves.

It is necessary to hold the complete assembly in an outer sheath. This sheath can be open at both ends, or it can be closed at the end that will be placed at the hot face of the lining. The former alternative is possible because, once the oxide powder is firmly packed, it does not pour from the sheath unless it is exposed to vigorous agitation. The sheath can be of any of the normal high temperature materials, for example, alumina, alundum, mullite, zirconia or magnesia. Alternatively, it can be of a plastic material that holds the assembly initially, so that it can be handled and inserted in a brick of the furnace wall by whatever means is selected. This plastic material burns away during use. Another alternative is that the thermocouple can be constructed inside a brick, using the brick itself as outer sheath. This can be done by drilling a hole through a brick and then conducting the thermocouple in the hole in the manner to be described below. It can also be done by molding a hole in a brick of castable refractory and building the thermocouple directly therein.

The thermocouple is constructed in the sheath, whatever its nature, by placing the sheath in a vertical position with its closed end downwards and so holding it. If an open ended sheath is used, it should be placed with one end on a flat surface. Next, the two insulated wires, in any of the alternative arrangements described above, are inserted so that they approximately reach the bottom. The powdered oxide material is then poured, a little at a time, into the sheathing, tapping and tamping after each addition to ensure maximum packing, until the sheath is filled. If desired, this end of the sheath can be blocked by any desired means such as by a plug of glass or quartz wool, by a plug of castable ceramic or by a terminal block.

The completed thermocouple can be installed in the furnace wall in any convenient way. If it has been constructed in a brick, the brick is built into the furnace wall during a relining operation. If it is in a sheath, one convenient method of installation is to build it into a brick of castable refractory and then to build the whole assembly into the furnace wall during relining. After installation, the wires themselves or other wires connected to them are led to the outside of the furnace shell and to a measuring or recording instrument.

In the appended drawings which illustrate preferred embodiments of the invention:

Figure 1:
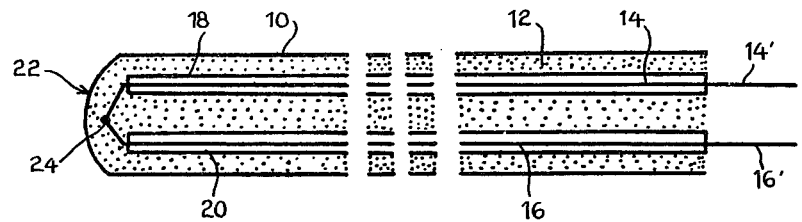
FIG. 1 represents a longitudinal view in cross-section of a self-healing thermocouple according to the invention.

The device represented in FIG. 1 includes an outer sheath 10, a powdered oxide material 12 closely packed within the outer sheath 10 and a pair of thermocouple wires 14 and 16 located inside the sheath 10 and separated therefrom by the oxide packing 12. Wires 14 and 16 are in spaced relationship, with oxide powder 12 therebetween, and are each encased in insulating sleevings 18 and 20, respectively. The outer sheath 10 is shown closed at its end 22 to be placed at the hot face of the refractory lining in a metallurgical furnace. At this end, the wires 14 and 16 terminate in a junction 24 and are so physically joined together in order to allow initial temperature detection starting from room temperature. The free ends 14' and 16' of the thermocouple wires are adapted to be connected with a measuring apparatus to record the internal surface temperature of the lining in the furnace.

The junction 24 of the thermocouple ensures that the initial temperatures of the lining can be monitered from ambient temperature all the way up to operating furnace temperature. Once the furnace has reached normal working temperature, the original junction 24 is destroyed as a result of erosion of the refractory lining. However, at this temperature, which is in the order of 1,400° – 1,600° C at the surface of the lining, the oxide powder 12 which has become electrically conductive react with the insulating sleevings 18 and 20 to form at all times a new junction between the thermocouple wires 14 and 16 at the hot face of the lining, thus ensuring a continuous operation of the device and hence a continuous recording of the internal surface temperature of the refractory lining.

Figure 2:
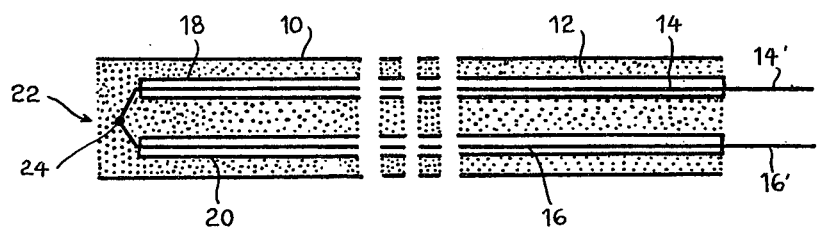
FIG. 2 is the same configuration as FIG. 1 with the exception that the normally closed end of the device, to be positioned at the hot face of the refractory lining, is left open.

In FIG. 2, the device is shown with the end 22 of the outer sheath 10 left open. As mentioned previously, this embodiment is possible since, once the oxide powder 12 is firmly packed, it does not normally pour from the sheath 10.

Figure 3:
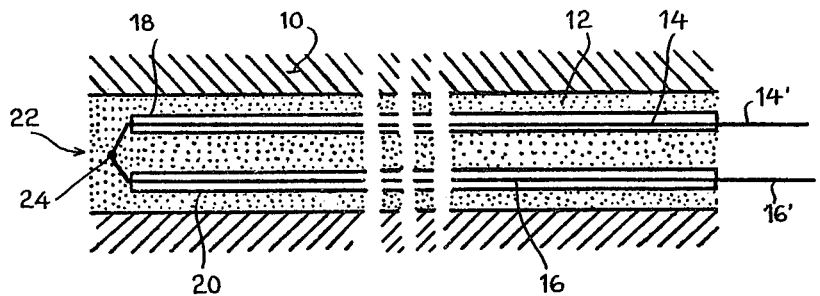
FIG. 3 is the same configuration as FIG. 2 except that the device is shown constructed directly in a brick as outer sheath.

The thermocouple of FIG. 3 is shown constructed inside a brick, using the brick itself as outer sheath 10. The whole assembly can be built into the furnace wall during a relining operation.

I claim:

1. A device for continuously monitoring the internal surface temperature of a refractory lining in a metallurgical furnace, which comprises:

an outer sheath;

a pair of dissilimar, metallic wires within the outer sheath, each of said wires being separately insulated by a sleeving of a refractory material having a melting point higher than the normal working temperature of the furnace at the surface of the lining; and a powdered oxide material closely packed within the sheath and surrounding both insulated wires, said oxide material being electrically conductive at elevated temperatures and having a melting point higher than said normal working temperature; whereby said insulating refractory material and conductive oxide material, on exposure to said normal working temperature, react with each other to form a conducting bridge between the dissimilar wires at the surface of the lining, operative to provide a signal related to said internal surface temperature.

2. A device as claimed in claim 1, wherein said outer sheath is a refractory tube formed with a closed end to be exposed to said internal surface temperature.

3. A device as claimed in claim 1, wherein said outer sheath is a refractory tube having an open end to be exposed to said internal surface temperature.

4. A device as claimed in claim 1, wherein said outer sheath is a refractory brick formed with a hole containing said wires and powdered oxide material.

5. A device as claimed in claim 1, wherein said outer sheath is of a high temperature material selected from the group comprising consisting of alumina, alundum, mullite, zirconia and magnesia.

6. A device as claimed in claim 1, wherein one of the wires is of platinum and the other of platinum-rhodium alloy.

7. A device as claimed in claim 1, wherein both wires are of platinum-rhodium alloy but of different compositions.

8. A device as claimed in claim 1, wherein both wires are physically joined at a common end to be exposed to said internal surface temperature.

9. A device as claimed in claim 1, wherein the insulating refractory material is selected from the group consisting of silica, alumina, mullite and magnesium oxide.

10. A device as claimed in claim 9, wherein the wires are positioned side by side and are encased in a common, tightly fit insulating sleeving.

11. A device as claimed in claim 9, wherein the wires are in spaced relationship, with said powdered oxide material therebetween, and are each encased in a tightly fit, thin walled insulating sleeving.

12. A device as claimed in claim 9, wherein the insulated wires are twisted together over the whole length that they are insulated.

13. A device as claimed in claim 1, wherein the powdered oxide material has a melting point of from 50° to 300° C higher than the temperature normally encountered at the surface of the lining.

14. A device as claimed in claim 13, wherein the particle size of said powdered oxide material is comprised between −50 and +230 mesh.

15. A device as claim in claim 13, wherein said powdered oxide material is a nickel ferrite having the general formula NiO. x $Fe_2O_3$ in which $x$ ranges from 1 to 1.2.

16. A device as claimed in claim 15, wherein said powdered oxide material is $NiO.Fe_2O_3$.

17. A device as claimed in claim 9, wherein the powdered oxide material is a nickel ferrite having the general formula NiO. x $Fe_2O_3$ in which $x$ ranged from 1 to 1.2.

18. A device as claimed in claim 17, wherein said powdered oxide material is $NiO.Fe_2O_3$.

* * * * *